United States Patent [19]

Park

[11] Patent Number: 5,519,678

[45] Date of Patent: May 21, 1996

[54] HEAD SEEK CONTROL APPARATUS CONTINUOUSLY DETECTS AND COMPENSATES FOR VARYING DISPLACEMENT VELOCITY OF OPTICAL HEAD

[75] Inventor: Sung C. Park, Incheon-shi, Rep. of Korea

[73] Assignee: Hyundai Electronics Ind. Co., Ltd., Kyeongki-do, Rep. of Korea

[21] Appl. No.: 246,056

[22] Filed: May 18, 1994

[30]     Foreign Application Priority Data

May 19, 1993 [KR]   Rep. of Korea ................. 93-8593

[51] Int. Cl.⁶ ............................................. G11B 7/085
[52] U.S. Cl. ................................. 369/44.28; 369/44.25
[58] Field of Search ................................. 369/32, 44.25, 369/44.28, 44.29, 54

[56]             References Cited

U.S. PATENT DOCUMENTS 5,307,333  4/1994  Ikeda et al. ...................... 369/44.28
5,311,490  5/1994  Matoba et al. ................... 369/44.28
5,394,386  2/1995  Park et al. ....................... 369/44.28

Primary Examiner—W. R. Young
Attorney, Agent, or Firm—Wenderoth, Lind & Ponack

[57]             ABSTRACT

An actuator of an Optical disk unit is controlled to convey an optical head to a target track in accordance with a tracking error signal and an acceleration pattern signal of the actuator. The acceleration pattern signal is integrated to obtain a commanded velocity of the actuator, and the tracking error signal is processed to determine a displacement velocity of the actuator. Also, a reference tracking error is determined in accordance with a variation of the displacement velocity. The commanded velocity, displacement velocity and reference tracking error are compared to obtain an error signal indicative of a difference between the commanded velocity and an actual displacement velocity of the actuator. The error signal is then differentiated and used to adjust the acceleration pattern signal, and the thus corrected acceleration pattern signal is used to drive the actuator.

6 Claims, 6 Drawing Sheets

HEAD SEEK CONTROL APPARATUS CONTINUOUSLY DETECTS AND COMPENSATES FOR VARYING DISPLACEMENT VELOCITY OF OPTICAL HEAD

FIELD OF THE INVENTION

This invention relates to a head seek control apparatus for an optical disk unit, and in particular, to a head seek control apparatus in which seeking control is effected according to a detected displacement velocity of an actuator.

BACKGROUND OF THE INVENTION

Optical disk units are known such as optomagnetic disk drivers, mini-disk players, laser disk players and the like, whereby an optical disk is used as a medium for recording and reproduction of video and/or audio signals. An optical pickup device is provided in such optical disk units for recording and reproducing data on the optical disk surface. A seeking operation is performed to position a laser beam from the optical pickup device relative to the optical disk surface, the seeking operation being controlled according to a difference between a current position and a target position of the laser beam.

A conventional head seek control apparatus shown in the block diagram of FIG. 1 includes a comparator 10 in which data is inputted signifying the current track position as a value which is one half of an actual value of the track position data; an adder/subtractor 20 for adding or subtracting the data from the comparator 10; a track-cross signal generator 30 responsive to a tracking error signal TE to generate a track-cross signal; a frequency/voltage convertor 40 for converting the frequency of the output from the track-cross signal generator 30 to a voltage value; a ROM 50 for outputting data stored at an address designated by the output from the adder/subtractor 20; a D/A convertor 60 for converting the digital signal from the ROM 50 to an analog form; a comparator/processor 70 for comparing the output signals from the frequency/voltage convertor 40 and the D/A convertor 60; an amplifier 80 for amplifying an output from the comparator/processor 70; and an actuator 90 having the amplified signal for displacement applied thereto. The velocity of displacement of the actuator 90 is detected by means of the voltage value of the tracking error signals TE applied through the frequency/voltage convertor 40. The error of the displacement velocity of the actuator 90 is detected as a value resulting from the comparison made by the comparator/processor 70 between the outputs from the frequency/voltage convertor 40 and the D/A convertor 60.

In this conventional head seek control apparatus, the continually varying velocity of the displacement of the head can not be detected as it is since the value must be latched before the subsequent clock is applied when the tracking error signal is converted to a voltage by the frequency/voltage convertor.

SUMMARY OF THE INVENTION

An object of the invention is to provide a head seek control apparatus for detecting a continuous variation of the displacement velocity of the actuator. According to the invention, a head seek control apparatus for an optical disk unit is provided which includes a first D/A convertor for converting a digital form of inputted data to an analog form, an integrator for integrating the analog signal derived from the D/A convertor, a track-cross detector for detecting a track-cross signal from an inputted tracking error signal TE, a reversible counter for counting down data in accordance with the detection signal of the track-cross detector upon having a clock signal applied thereto, a DIP switch for loading a determined data value to the reversible counter, a second D/A convertor for converting the signal from the reversible counter to an analog form, a reference tracking error signal generator for generating a reference tracking error signal for detecting a variation of the displacement velocity from a signal detected by the track-cross detector, an invertor for reverse-converting the output from the reference tracking error generator, an error detector for comparing the outputs of the invertor, the second D/A convertor and the integrator for detecting an error between the actual displacement velocity and a commanded velocity, a differentiator for differentiating an error signal from the error detector, an error corrector for correcting the output from the first D/A convertor by an error signal produced from the differentiator, an amplifier for amplifying the signal corrected by the error corrector, an actuator adapted to be driven by an amplified signal from the amplifier, and a counter for counting the number of tracks to be traversed for head seeking by means of detection signals of the track-cross detector.

DETAILED DESCRIPTION OF THE PREFERRED EMBODIMENT

Figure 1:
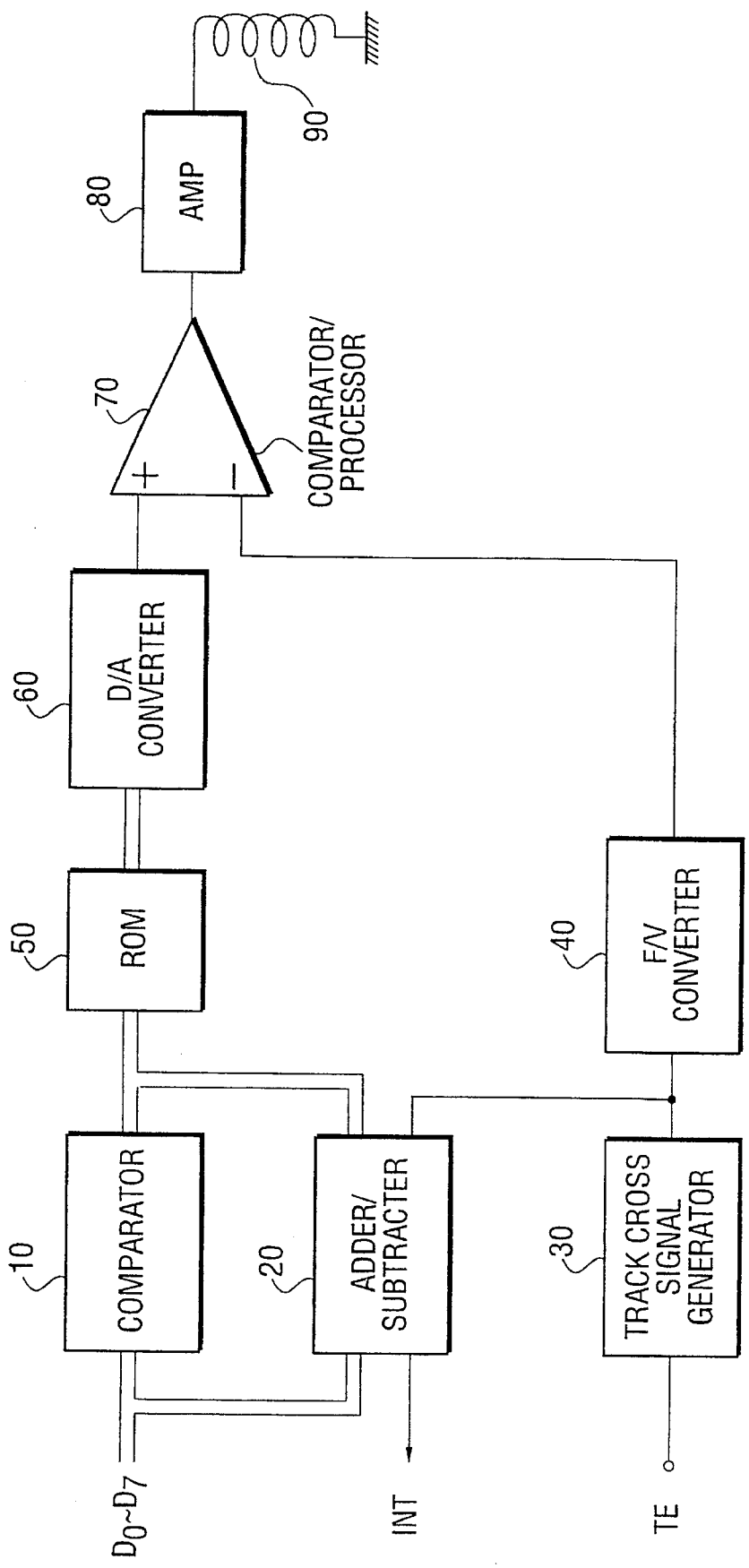
FIG. 1 shows a block diagram of the conventional head seek control apparatus.
Figure 2:
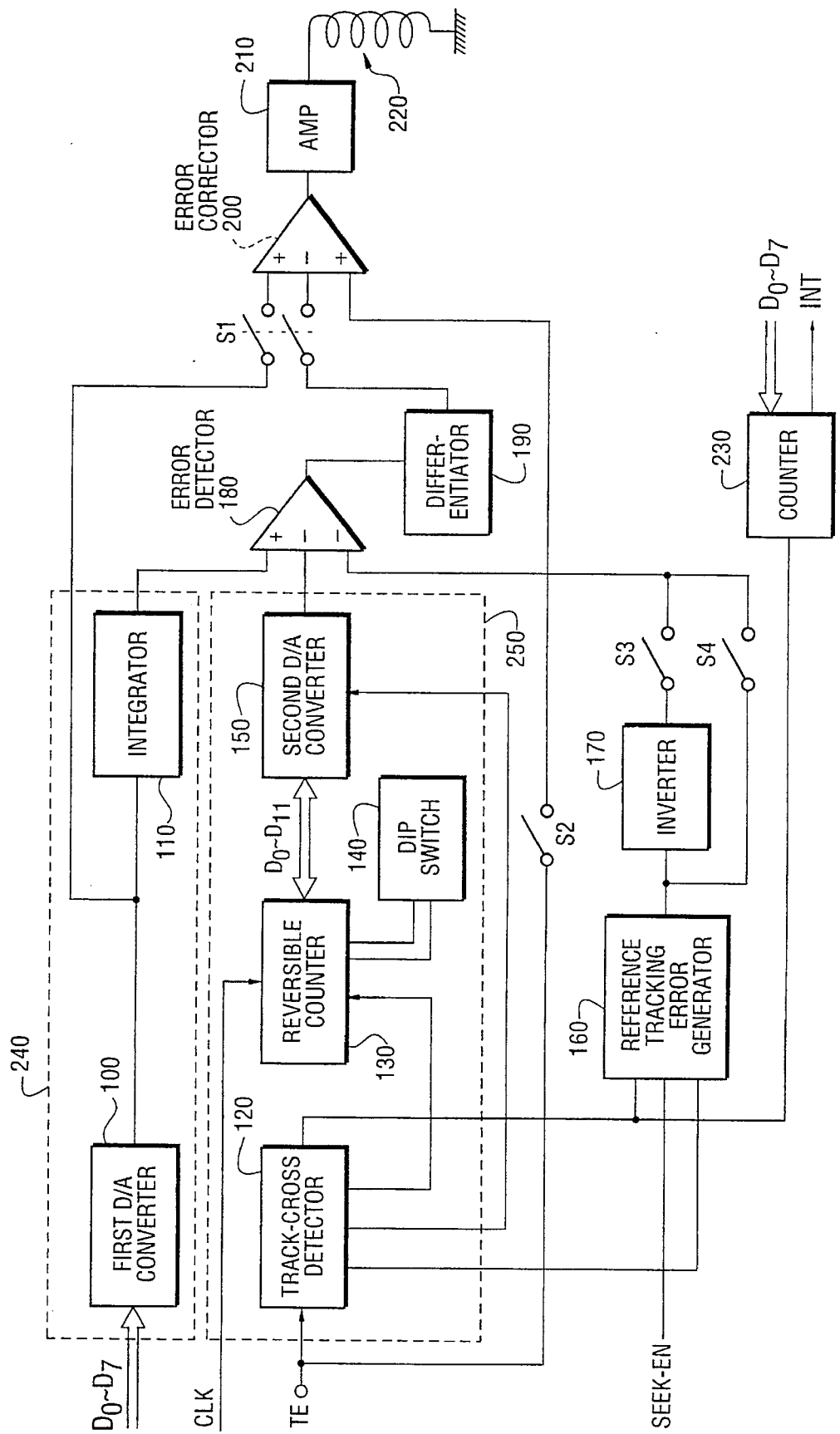
FIG. 2 shows a similar diagram of a head seek control apparatus embodied by the invention.

An embodiment of the invention will be described with reference to FIG. 2 where a block diagram of the embodiment is shown.

The embodiment shown includes a commanded velocity generator 240 for deriving a commanded velocity for an actuator 220 from acceleration pattern signals, a displacement velocity generator 250 for producing a displacement velocity of the actuator from a tracking error signal denoting a difference from a target track displacement, a reference error generator 160 for generating a reference error signal for detecting a variation of the displacement velocity from a signal outputted from the displacement velocity generator 250, an error detector 180 for comparing the outputs from the reference tracking error signal generator 160, the displacement velocity generator 250 and the commanded velocity generator 240 so as to detect an error between the actual velocity and the commanded velocity, and an error corrector 200 for correcting an acceleration pattern signal converted to an analog form in the commanded velocity generator 240 with an error signal resulting from differentiation of an output from the error detector 180.

The commanded velocity generator 240 includes a first D/A convertor 100 for converting an acceleration pattern signal to an analog form, and an integrator 110 for integrating the signal converted by the first D/A convertor 100.

The displacement velocity generator 250 includes a track-cross detector 120 for detecting a track-cross signal from a tracking error signal TE inputted thereto, a reversible counter 130 for counting down data in accordance with the detection signal of the track-cross detector 120 when applied with a clock signal, a DIP switch 140 for loading a determined data value to the reversible counter 130, and a second D/A convertor 150 for converting the signal from the reversible counter 130 to an analog form.

Figure 5:
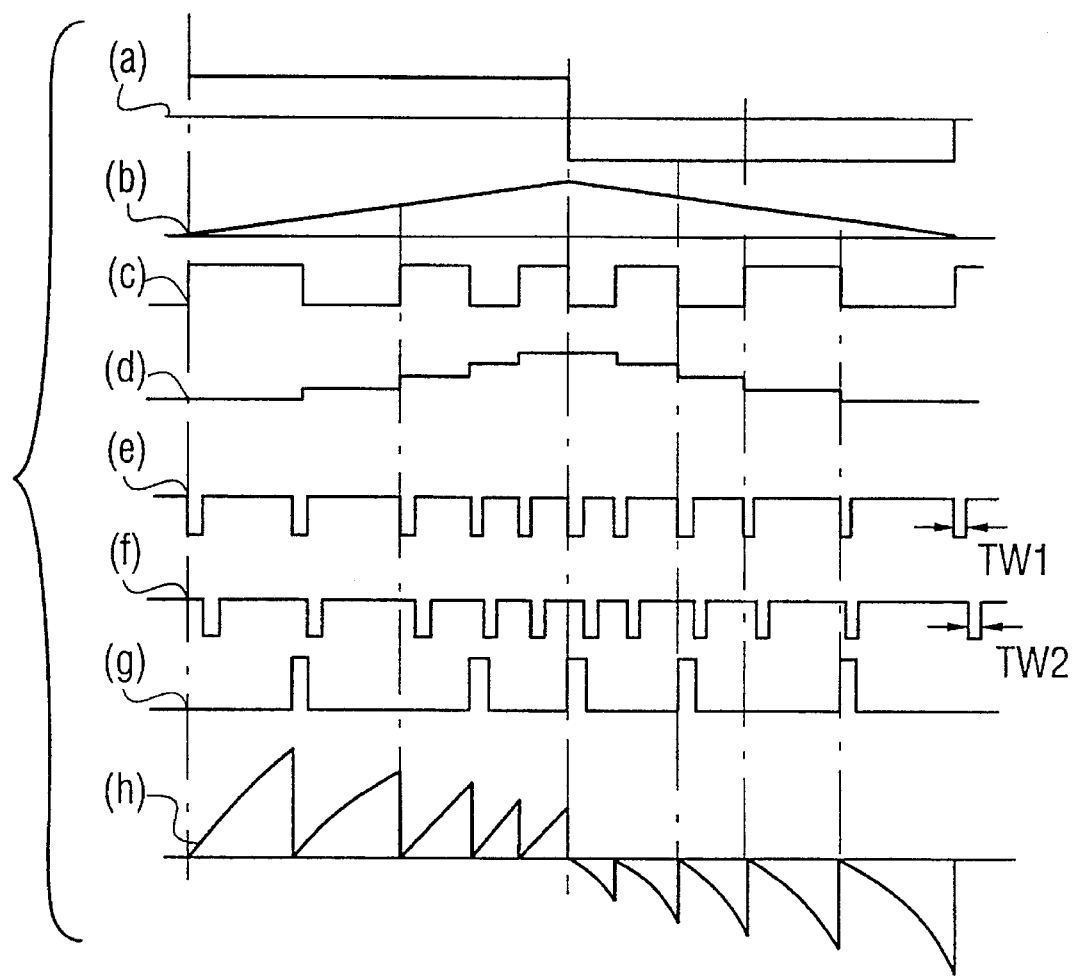
FIG. 5 shows a waveform timing chart of the operation of the embodiment.

FIG. 5 shows a timing relationship of a signal (a) applied to the first D/A convertor 100, a signal (b) derived from the integrator 110, signals (c), (e), (f) and (g) outputted from the track-cross detector 120 (as described in more detail below with reference to FIG. 3), a signal (d) which is applied from the second D/A convertor 150, and a signal (h) appearing at third and fourth switches S3 and S4 of the invertor 170.

The operation of the embodiment shown in FIG. 2 will be described with reference to FIG. 5. When a head seek operation starts, a driver controller of an optical disk unit applies the acceleration pattern signal (a) shown at FIG. 5 to the first D/A convertor 100, with a first and second switches S1 and S2 being turned on and off, respectively. Thus, an output of the first D/A convertor 100 passes through the first switch S1 and the error corrector 200 and then is amplified by the amplifier 210 for application to the actuator 220 for starting movement of the actuator to the target track. This generates a tracking error signal TE which is applied to the track-cross detector 120.

The track-cross detector 120 produces signals (c), (e), (f) and (g) shown in FIG. 5. The signal (c) is applied to the reference tracking error signal generator 160 and the counter 230, and the signals (e), (f) and (g) are applied to the second D/A convertor 150, the reversible counter 130, and the reference tracking error signal generator 160, respectively.

The reversible counter 130 is applied with the signal (f) of FIG. 5 derived from the track-cross detector 120 as a data loading signal, and is loaded with data by the DIP switch 140 upon its being at a low level and counts down the number of the clock signals CLK applied from the loaded data upon being at a high level.

The second D/A convertor 150 produces a signal (d) as shown in FIG. 5 on a basis of the signal (e) of FIG. 5 derived from the track-cross detector 120. Specifically, when the signal (e) is a low level, the reversible counter 130 is caused to apply data D0–D11 thereto. When it is a high level, the data values during the low level are latched.

Accordingly, the track-cross detector 120, reversible counter 130 and second D/A convertor 150 serve in combination to sample the velocity of the actuator every time the actuator moves over one half track of a disk.

Upon application of a head seek enable signal Seek-EN, the reference tracking error signal generator 160 responds to arrival of the signals (e) and (g) of FIG. 5 to generate a reference tracking error signal which is shaped by the convertor 170 and the third and fourth switches S3 and S4 to a one-half inverted form shown as signal (h) in FIG. 5.

The error detector 180 serves to detect an error of the actual velocity against the commanded velocity of the actuator 220, or in other words, a difference between a sum signal, which is a sum of the signal (d) from the second D/A convertor 150 and the reference tracking error signal (h), and the signal (b) from the integrator 110. By integrating the signal (a) in the integrator, a commanded velocity signal (b) is obtained. The fourth and third switches S4 and S3 are turned on and off, respectively, at the acceleration phase of the velocity, and vice versa at the deceleration phase.

The differentiator 190 acts to differentiate error signals detected by the error detector 180 and applies its output to the error corrector 200 which acts to subtract the differentiated signal from the commanded velocity. When the displacement velocity and the commanded velocity are equal, the output of the differentiator is OV so that the signal (a) is applied via the first switch S1 and the error corrector 200 to the amplifier to drive the actuator 220. When the displacement velocity is greater than the commanded velocity whereby the differentiator produces a positive voltage, the error corrector 200 acts to decrease the commanded velocity so as to correctively reduce the displacement velocity for the actuator 220.

The counter 230 is loaded via a data bus with a number equal to the target track/2 prior to a head seeking operation in order to count the number of tracks to be passed for the head seeking operation. When the seeking operation starts, the counter 230 counts down the number of the track cross signals as applied by the track cross detector 120 from the value loaded therein, and when the value reaches zero, the drive controller is applied with an interrupt signal INT to invert the polarity of the signal (a) of FIG. 5. This causes the counter 230 to again be loaded with a number equal to the target track/2 and then to start a counting down operation. When the value in the counter 230 reaches zero again, the interrupt signal INT is applied to the drive controller which turns off the first switch S1 and turns on the second switch S2 to return to a tracking mode, which ends the head seeking operation to the target track.

Figure 3:
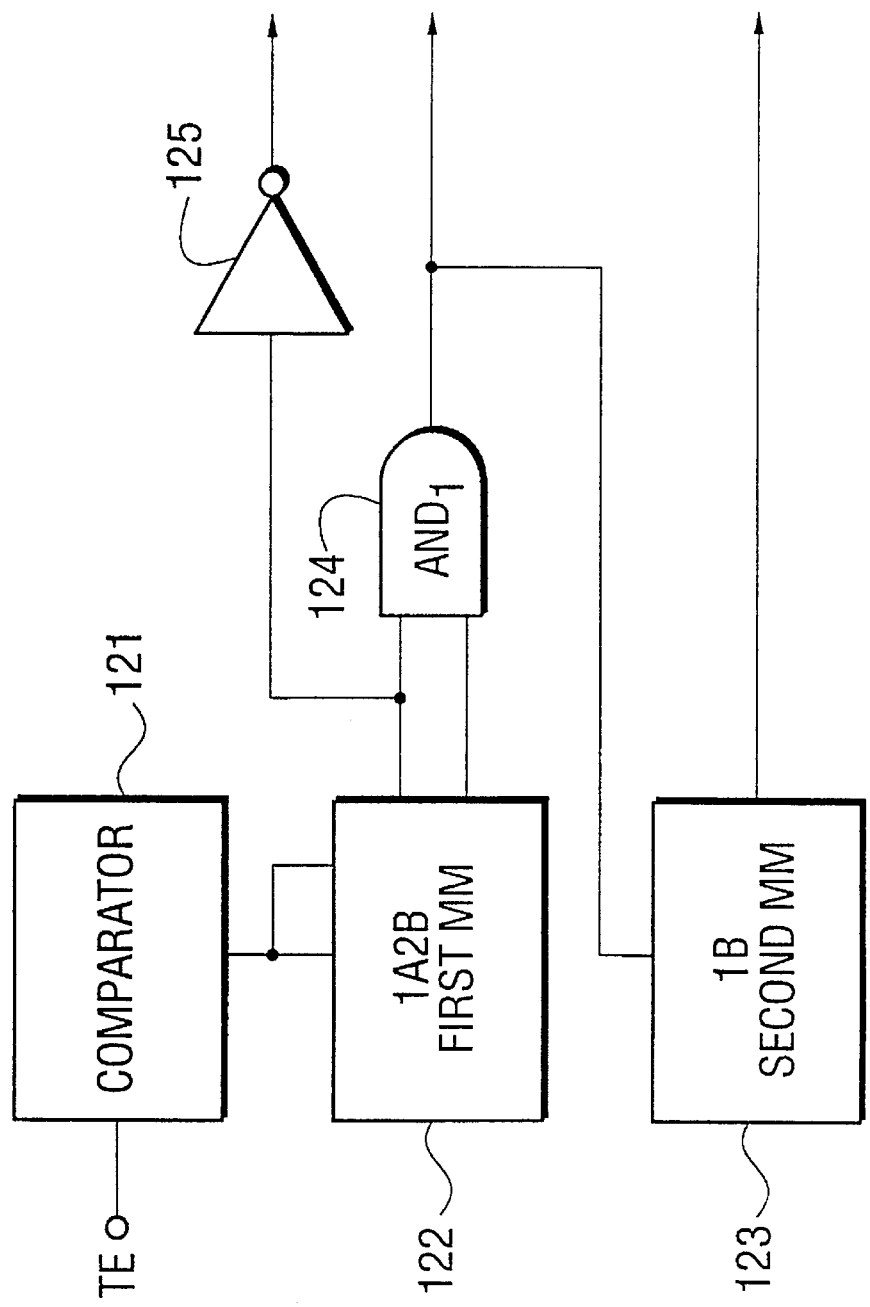
FIG. 3 shows in detail track-cross detector included in the embodiment.

The track cross detector means 120 is shown in FIG. 3 in detail and includes a comparator 121 for detecting positive and negative edge signals of a tracking error signal TE, first and second monostable multivibrators 122 and 123 for generating a signal of a determined pulse width in response to the output of the comparator 121, a logical multiplier 124 for executing a multiplication operation and an invertor 125. In operation, as the comparator 121 is applied with a tracking error signal, a signal (c) of FIG. 5 is generated. The first monostable multivibrator 122 responds to the signal from the comparator 121 to generate a signal (e) shown at FIG. 5 having a pulse width tw1 at each of the positive and negative edges of the signal (e). The signal of FIG. 5 is treated by the multiplier 124 and applied to the second D/A convertor 150. The pulse width tw1 is determined by values of a resistance and a condenser coupled to the first monostable multivibrator. The width is the minimum length of time needed for the second D/A convertor 150 to process data applied thereto. The second monostable multivibrator 123 responds to the output from the first monostable multivibrator 122 to generate a signal (f) shown at FIG. 5 having a determined pulse width tw2 at each positive edge of the signal (e). The signal of (f) is applied to the reversible counter 130. The pulse width tw2 is the minimum length of time needed for the reversible counter 130 to store the data.

Figure 4:
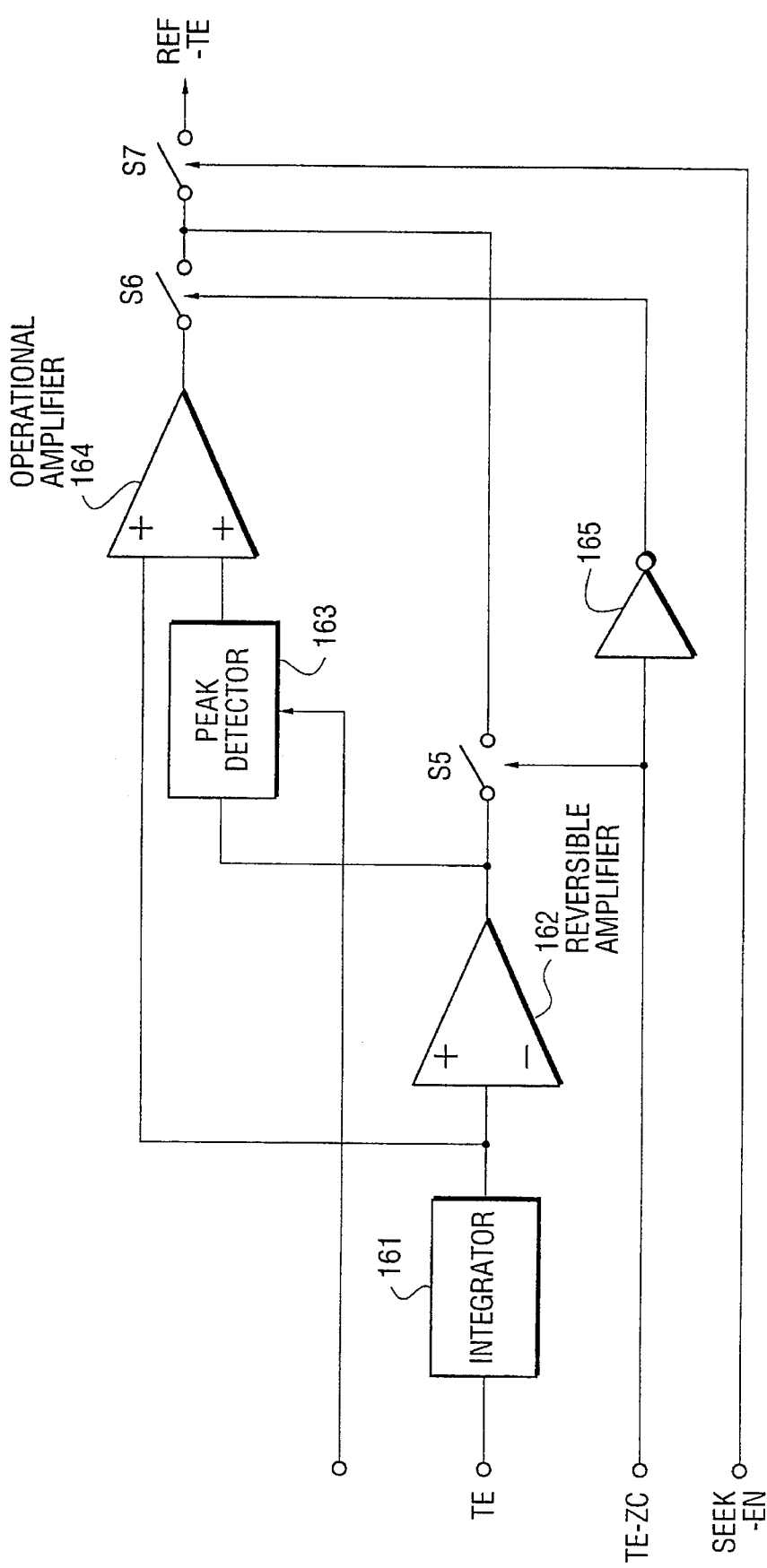
FIG. 4 shows in detail a reference tracking error signal generator in the embodiment.

The reference tracking error signal generator 160 is shown in FIG. 4 in detail and includes an integrator 161 for integrating the tracking error signals TE, an inversion amplifier 162 for inversion-amplifying an output of the integrator 161, a peak detector 163 for detecting a peak of the signal derived from the inversion-amplifier 162, and operational amplifier 164 for operationally amplifying a peak value detected by the peak detector 163 and the output from the integrator 161, and fifth, sixth and seventh switches S5, S6 and S7.

Figure 6:
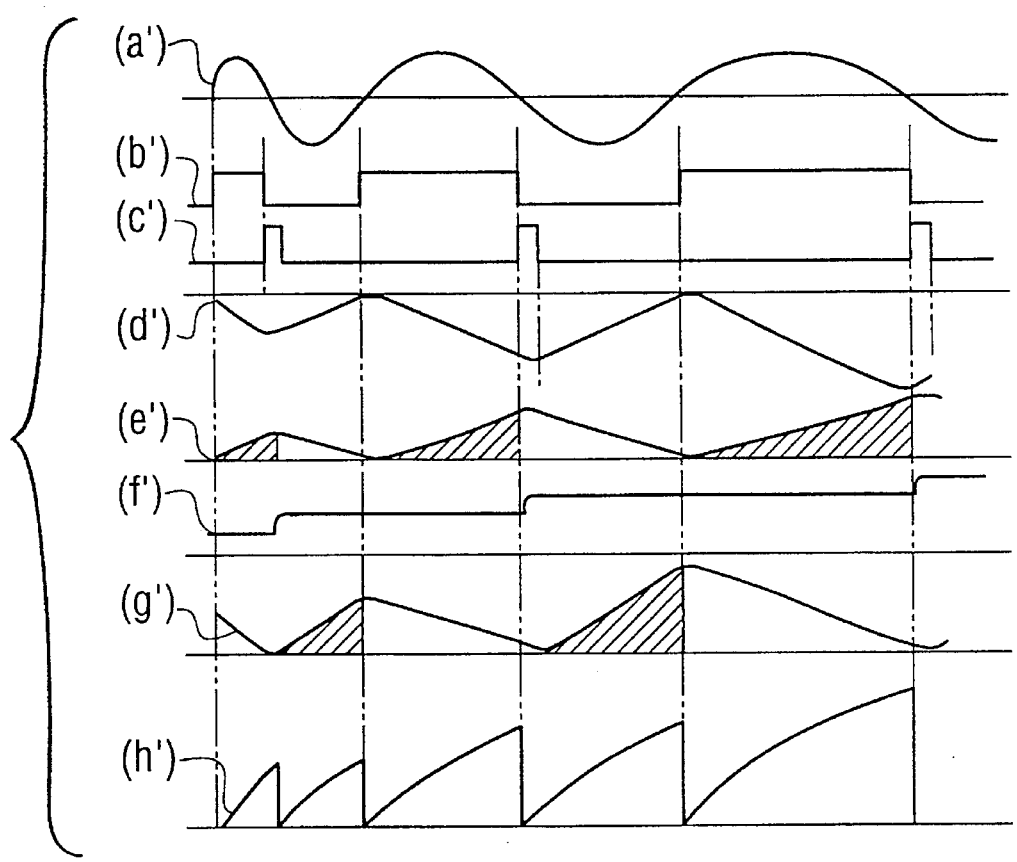
FIG. 6 shows a similar chart of the operation of the reference tracking error signal generator. Reference numeral 100 in FIG. 2 designates a first D/A convertor; 110 an integrator; 120 a track-cross detector; 130 a reversible counter; 150 a second D/A convertor; 160 a reference tracking error signal generator; 180 an error detector; 190 a differentiator; 200 an error corrector; 220 an actuator; 230 a counter; 240 a commanded velocity generator; 350 a displacement velocity generator.

The operation of the reference tracking error generator will be described with reference to FIG. 6 showing the timing chart of the associated signals. When a tracking error signal (a') has a negative polarity, a signal (b') causes the sixth switch S6 to be turned on by the intermediary of the invertor 165. The signal (a') or a tracking error signal is integrated by the integrator 161 to provide a signal shown (d') which is in turn inverted by the inversion amplifier 162 into a signal (e'). The signal (e') has a peak detected by the peak detector 163 to produce a signal (f'). The operational amplifier 164 adds the signals (d') and (f') from the peak detector 163 and the integrator 161, respectively, to produce a signal (g') which has shadowed regions serving as a reference tracking error signal.

Conversely, when the tracking error signal (a) shown in FIG. 6 has a positive polarity, the fifth switch S5 is caused by the signal (b') to be turned on. The signal (a') or a tracking error signal is integrated by the integrator 161 to provide a signal (d') which is in turn inverted by the inversion amplifier 162 into a signal (e') which has shadowed regions serving as a reference tracking error signal.

According to the invention, a signal generated by the track-cross detector every time the actuator passes over ½ track permits detection of the displacement velocity during the ½ track excursion. A clock signal having a higher frequency than the track cross signal is applied to the reversible counter and D/A convertor whereby the reference tracking error generator permits a continuous variation of the displacement velocity during the latched period, achieving a precise detection of the displacement velocity.

What is claimed:

1. An apparatus for controlling an actuator of an optical disc unit to convey an optical head to a target track in accordance with a tracking error signal and an acceleration pattern signal of the actuator, said apparatus comprising:

commanded velocity generating means for receiving the acceleration pattern signal, for determining a commanded velocity of the actuator from the acceleration pattern signal and for outputting a corresponding commanded velocity signal;

displacement velocity generating means for receiving the tracking error signal, for determining a displacement velocity of the actuator and for outputting a corresponding displacement velocity signal;

reference tracking error generating means, operatively coupled to said displacement velocity generating means, for determining a variation of the displacement velocity of the actuator and for generating a corresponding reference tracking error signal;

error detecting means, operatively coupled to said commanded velocity generating means and said displacement velocity generating means and said reference tracking error generating means, for comparing the commanded velocity signal and the displacement velocity signal and the reference tracking error signal and for generating a corresponding error signal indicative of a difference between the commanded velocity and an actual displacement velocity of the actuator;

a differentiator, operatively coupled to said error detecting means, for differentiating the error signal and for generating a corresponding differentiated error signal; and error correcting means, operatively coupled to said differentiator, for adjusting the acceleration pattern signal in accordance with the differentiated error signal and for generating a corresponding corrected acceleration pattern signal for driving the actuator.

2. An apparatus as claimed in claim 1, further comprising a counter, operatively coupled to said displacement velocity generating means, for counting a number of tracks traversed by the optical head.

3. An apparatus as claimed in claim 1, wherein said commanded velocity generating means comprise a D/A convertor for converting the acceleration pattern signal to an analog signal, and an integrator for integrating the analog signal to obtain the commanded velocity signal.

4. An apparatus as claimed in claim 1, wherein said displacement velocity generating means comprise track-cross detector means for detecting a track-cross signal from the tracking error signal, a reversible counter for counting down data in accordance with a detection signal of the track-cross detection means upon being applied with a clock signal, a DIP switch for loading a determined data value to said reversible counter, and a D/A convertor for converting the signal from the reversible counter to an analog signal.

5. An apparatus as claimed in claim 4, wherein said track-cross detector means comprise a comparator for detecting positive and negative edges signal of the tracking error signal, and first and second monostable multivibrators for generating a signal of a determined pulse width in response to an output of the comparator.

6. An apparatus as claimed in claim 1, wherein said reference tracking error signal generating means comprise an integrator for integrating the tracking error signal, an inversion amplifier for inversion-amplifying an output of the integrator, a peak detector for detecting a peak of a signal output from the inversion-amplifier, and an operational amplifier for operationally amplifying a peak value detected by the peak detector and the output from the integrator.

* * * * *